March 23, 1943.  F. T. KERN  2,314,542
APPARATUS FOR SEPARATING MATERIALS
Filed March 15, 1941
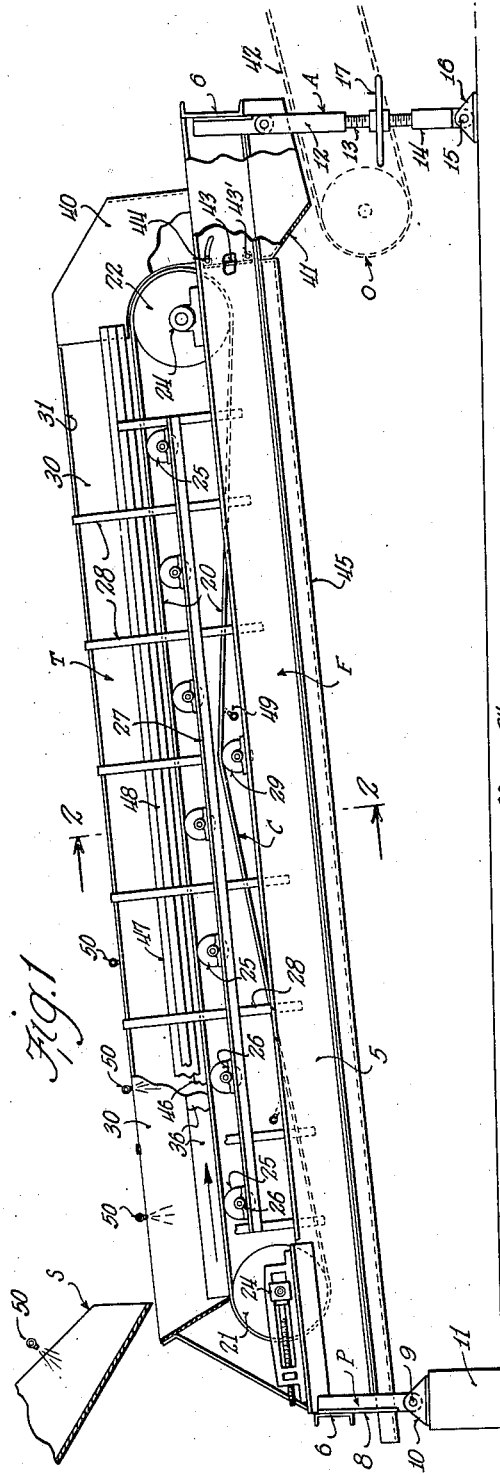
INVENTOR.
FRED T. KERN
BY John W. Michael
ATTORNEY.

Patented Mar. 23, 1943

2,314,542

UNITED STATES PATENT OFFICE 2,314,542

APPARATUS FOR SEPARATING MATERIALS

Fred T. Kern, Milwaukee, Wis.

Application March 15, 1941, Serial No. 383,503

14 Claims. (Cl. 209—428)

This invention relates to an apparatus for use primarily in separating liquids from solids, as for example in dewatering sand, although it is also applicable to the separation of one grade of solids from another, as for example, the removal of a film of clay or the like from the surfaces of stone or gravel.

The invention in any of its applications makes a controlled use of the natural tendency of a liquid suspended loosely and by the force of adhesion in a more or less finely divided solid or aggregate to flow clear thereof under the influence of gravity, and accelerates and completes the action by supplying an appropriate hydrostatic head, the requisite time period, sufficient movement or agitation, and appropriate facilities for drainage of the liquid.

An object of the invention is to provide an apparatus of this character, which is simple, rugged in construction, efficient, and convenient in operation, which has capacity for quantity production, and which is economical to manufacture, operate, and maintain.

In carrying out the present invention use is made of an inclined endless belt conveyor which has combined therewith a trough-forming means extending for substantially the full length of the upper run of the conveyor, and constituted of substantially vertical trough-forming walls superimposed upon the conveyor and utilizing the upper run of the conveyor as the bottom wall of the trough. The trough-forming walls are provided with drainage slots adjacent their lower edges and for their full length, and such slots may be conveniently provided by spacing the lower edges of the side walls an appropriate distance from the underlying surface of its upper run of the conveyor. The conveyor belt is run at a slow speed and the materials to be separated are fed into the trough at the low end of the conveyor at a rate which will result in their building up into a bed of material on the conveyor belt of substantial depth, a depth equal to approximately the height of the trough. In this way the liquid suspended in the solid aggregate is placed under an appropriate hydrostatic head and its natural tendency to flow clear of the particles of the aggregate is accentuated so that it drains not only off the low end of the conveyor belt but also laterally out through the drainage slots provided between the lower edges of the trough-forming walls and the underlying surface of the upper run of the conveyor belt. To control the lateral drainage, means is provided paralleling the trough-forming walls and coacting therewith, and with the upper run of the conveyor belt, to provide drainage channels which carry the laterally drained liquid directly down to the low end of the conveyor, and thereby prevents the drained liquid from slopping over on to the supporting and driving mechanism for the conveyor belt. At the discharge end of the trough, that is at the high end of the conveyor, means is provided for carrying off the cleansed or dewatered solid aggregate.

In the application where sand is being dewatered, a scraper or gate may be provided to separate the main bulk of dewatered sand from the thin underlying strata adjacent the conveyor belt which may still retain a considerable amount of water.

Where the apparatus is utilized for the purpose of separating one grade of solid from another, as for instance the removal of film of clay from the surfaces of stones, gravel, or other aggregate of particle size of this order, the material, when fed into the trough at the lower end of the conveyor, is subjected to the action of water sprays which are provided over an appropriate length of the upper run of the conveyor. Water sprayed on to the aggregate will entrain or suspend the film of clay, and as the water drains in the manner described it will carry the clay with it so that a cleansed aggregate free of clay will be carried off from the discharge end of the trough at the upper end of the conveyor.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a view in side elevation illustrating an apparatus embodying the present invention, parts being broken away and parts being shown in section for the sake of illustration;

Figure 2 is a view in transverse cross section taken on line 2—2 of Figure 1; and Figure 3 is a fragmentary view in longitudinal vertical cross section taken on line 3—3 of Figure 2, illustrating the adjustable slight brace of the trough-forming walls.

Referring to the drawing, and more particularly to Figure 1, it will be seen that an apparatus embodying the present invention comprises generally a supporting frame F inclined with respect to the horizontal and having its lower end mounted on a pivotal support P and its upper end mounted on an adjustable support A. An endless belt conveyor, designated generally at C, is mounted on the frame F. Trough-forming means, designated generally at T, is provided and combined with the upper run of the endless conveyor belt. The materials to be separated are fed into the trough at the low end of the endless belt by suitable supply means such as a feed conveyor by suitable supply means such as a feed chute S, and material after being processed is carried off from the apparatus by suitable means, such as an off-take conveyor O.

The frame F may be fabricated in any suitable way, and for the sake of illustration it is shown as being made up of two parallel side channels 5 cross connected at their ends by end channels 6 and suitably interconnected intermediate their ends by an appropriate number of cross members 7. The lower end of the frame has posts 8 welded, riveted, or otherwise suitably secured to the side channels 5 and the adjacent end channels 6. These posts 8 may be angle irons with their side flanges adjacent their lower ends cut away to adapt them to be pivotally supported, as at 9, on supporting brackets 10 rigidly mounted on a foundation 11. Jointed posts 12 are suitably connected to the side channels and the adjacent cross channels 6 at the upper end of the frame, and the lower end section of each jointed post 12 is tubular and internally threaded to coact with a vertically adjustable supporting screw 13. The screw 13 has an upper end interthreaded with the internal threads of the lower section of the jointed post 12 and has its lower end similarly interthreaded with a supporting socket 14 pivotally connected, as at 15, to a supporting bracket 16 rigid with the foundation or base. A handwheel 17 is fixed to the central portion of the screw 13 to facilitate turning of the same. The details of this vertical adjustable support for the upper end of the frame F are per se no part of the present invention as any appropriate vertically adjustable support will serve, as will be understood by those skilled in the art. It is advantageous, however, to so support the frame F that its inclination with respect to the horizontal may be adjustable to suit conditions or to suit the nature of the materials being handled and treated.

The endless belt in conveyor C comprises an endless belt or apron 20 which is trained or reeved about an adjustable idler roller 21 and a driving roller 22, the rollers 21 and 22 being rotatably mounted in suitable bearings 24 adjacent the opposite ends of the frame F. Suitable power means (not shown) is provided for driving the roller 22 at an appropriate slow speed. An electric motor, or other type of motor, and suitable gearing all well known in the art, may be employed as a controllable source of power. It is of importance that the upper run of the endless belt or apron 20, while inclined with respect to the horizontal, be substantially flat and present a plane though inclined surface. Hence, suitable means is provided to support the upper run of the conveyor belt in this manner. For example, a plurality or series of rather closely spaced supporting or idler rollers 25 may be utilized, these rollers having trunnions at their ends rotatably supported in suitable bearings 26 provided therefor on angle irons 27. The angle irons 27 are supported on inverted U-shaped supports 28 which have their lower ends of their side legs fastened to the side channels 5 in the frame F. The lower run of the conveyor belt may be suitably tensioned by a tensioning roller 29.

The trough T includes spaced, parallel and vertically disposed trough-forming walls 30, which may be elongated flat plates of metal. The upper edges of the trough-forming walls 30 are provided with outturned flanges 31 having bolt holes therein adapted to be selectively registered with corresponding bolt holes 33 provided in the body portions or cross members of the U-shaped supports 28. Bolts or nuts, or other suitable fastening means 34 coact with the flanges 31 and with the cross members of the supports 28 to support the trough-forming walls 30 in any particular adjustment or transverse spacing. Braces 35 coact with the trough-forming walls and with the supports to rigidly secure the walls in position. The walls coacting with the portion of the upper run of the conveyor comprehended therebetween define a trough. The lower edges of the walls are slightly spaced from the surface of the upper run of the conveyor which underlies the same to provide drainage slots extending the full length of the trough. In many instances it is advantageous to have an adjustable control over the height of these drainage slots, and for this purpose the trough walls 30 may be provided with adjustable skirt boards 36 releasably and adjustably secured, as at 37, to their lower edges.

The lower end of the trough is open so as to afford full opportunity for drainage. Spilling of any appreciable amount of the material to be delivered to the lower end of the trough is prevented by virtue of the upward travel of the upper run of the conveyor belt and selection of the point of delivery of the material through from the supply chute S.

The upper end of the trough is laterally enclosed by side plates on aprons 40 which insure delivery of the separated material to a discharge chute 41 which empties on to an off-take conveyor 42.

Where the apparatus is utilized for the purpose of dewatering sand, some appreciable amount of water or moisture may remain in the thin layer or strata of sand just adjacent the surface of the conveyor belt, and this may be returned or re-circulated by providing a scraper or gate 43 pivotally supported on the frame F, as at 43', and releasably secured in operative position by suitable securing means 44. The active or scraper edge of the gate or scraper 43 is thus placed in effective and cooperative interrelation with the portion of the endless conveyor belt which travels about the drive pulley 22. The water and sand which passes under the scraper 43 and around to the lower end of the belt is deposited on a return pad 45 carried back from the discharge end of the machine.

To prevent the water which drains through the drainage slots from slopping over the sides of the conveyor and on to its supporting and driving structure, means is provided which defines drain channels paralleling the trough-forming walls. The drain channel-forming structure may comprise elongated strips 46 of rubber or cotton duck belting suitably attached to vertically adjustable supporting strips 47 of sheet metal, the strips 47 being in turn appropriately and adjustably secured to supporting brackets 48 carried on the inverted U-shaped supports 28.

With an apparatus constructed in the manner described, the materials to be separated are supplied through the chute S into the end of the trough T at the lower end of the upper run of the conveyor belt C. The endless belt conveyor is driven at a slow rate of speed and its upper run advances continuously but slowly so that material that is fed into the trough will form into a bed of substantial height. If the material is sand heavily loaded with water, the hydrostatic head of the water in the bed of material formed in the trough will accelerate the drainage of the water through the drainage slots, as well as out through the lower end of the trough so that by the time the bed of material reaches the upper or discharge end of the trough, it will be substantially devoid of moisture and will be delivered in such condition to the discharge chute 41 and off-take conveyor O. The relatively thin strata or layer on the surface of the belt still retaining a substantial amount of water will be returned by the scraper to the return pan and be reprocessed or re-circulated. Water sprays 49 are provided for washing off the under surface of the bottom or return run of the conveyor belt 20 and flowing the material down through return pan 45.

If the apparatus is utilized for the purpose of removing one grade of solid from another, as for example removing a film of clay from crushed stone or gravel, then in addition to the instrumentalities hereinbefore described, a suitable number of water sprays, designated at 50, are provided to spray water on the material as it flows down through the chute, and as it advances up through the trough. The water so sprayed will wash off the clay and entrain or suspend it, and both clay and water will drain off in the manner previously described.

While I have shown and described constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

I claim:

1. An apparatus of the character described for separating materials and comprising an endless belt conveyor, means supporting the conveyor with its upper run disposed at an inclination to the horizontal, means for driving the conveyor at slow speed, trough-forming walls overlying the upper run of the conveyor disposed in spaced parallel relation and extending for substantially the full length of the upper run of the conveyor, the lower edges of said walls being spaced from the underlying surfaces of the upper run of the conveyor to define lateral drainage slots extending for substantially the full length of the conveyor, means for supplying the materials to be separated to the end of the trough located at the low end of the conveyor, means for spraying materials in the trough with water as they are advanced through the trough, means for carrying off the solid separated material from the end of the trough located at the high end of the conveyor.

2. An apparatus for separating solid mineral aggregates from water suspended therein and comprising an inclined endless belt conveyor, means coacting with the upper run of the conveyor to define a trough open at its top and at its ends and substantially closed at its bottom by the portion of the upper run of the belt of the conveyor located between said trough-forming means, the clearance between the trough-forming means and the conveyor belt providing lateral drainage slots, means for supplying the mineral aggregate and its contained water to the end of the trough located at the low end of the conveyor, a scraper extending across and adjacent to the surface of the belt emerging from the trough at the high end of the conveyor for separating the dewatered mineral aggregate from the thin strata next adjacent the surface of the belt conveyor, means for re-circulating said strata, and means for carrying off the separated solid aggregate from the end of the trough at the high end of the conveyor.

3. An apparatus for separating materials having a liquid loosely suspended therein and comprising an endless belt conveyor, trough-forming walls positioned above the upper run of the conveyor and transversely spaced from each other and inwardly spaced from the side edges of the conveyor to define a trough open at its top and at its ends and having its bottom constituted by the portion of the upper run of the conveyor comprehended between said walls, the lower edges of the walls being spaced from the underlying surfaces of the conveyor to define lengthwise drainage slots, means coacting with the edge portions of the conveyor and with said walls to define drainage channels extending lengthwise of the conveyor along the outsides of said walls, means for supplying materials to be separated to the trough at the low end of the conveyor, and means for carrying off separated material from the high end of the conveyor.

4. A dewatering device of the character described comprising a supporting frame, a pivotal mounting for one end of said frame, a screw and nut mechanism cooperable with the opposite end of the frame for supporting the same at an angle to the horizontal, a conveyor including an endless belt extending lengthwise of the frame for substantially the full length thereof, a driving pulley rotatably mounted on the frame and cooperable with one end of the belt, a tail pulley also rotatably supported on the frame and cooperable with the opposite end of the belt, idler pulleys rotatably mounted on the frame and having supporting engagement with spaced portions of the upper run of the belt intermediate the ends thereof, trough-forming walls supported on the frame above the conveyor and extending upwardly from the upper run of the conveyor belt and also longitudinally thereof just inwardly of its side edges so as to define a trough of substantial height bottomed by the upper run of the belt for substantially the full length of the conveyor, and skirt boards paralleling said trough-forming members for substantially their entire extent, said skirt boards being disposed adjacent the side edges of the upper run of the belt and close to the top surface thereof so as to cause water draining from the trough to run downwardly along the conveyor and discharge from the lower end thereof.

5. A dewatering device of the character described comprising an endless belt conveyor inclined with respect to the horizontal, vertically disposed longitudinally extending trough-forming walls positioned above the upper run of the conveyor and transversely spaced from each other and from the side edges of the conveyor to define a trough open at the top and having its bottom constituted by a portion of the upper run of the endless belt conveyor, the lower edges of said walls being spaced slightly from the top surface of the conveyor to provide for drainage of the water from sand laterally on to portions of the upper run of the conveyor located outside said trough-forming walls, skirt boards cooperable with the conveyor and with said trough-forming walls to define the drainage channels for conducting water drained from the sand to the trough to the lower end of the conveyor, means for supplying sand to be dewatered to said trough at the lower end of the conveyor, and means for carrying off the dewatered sand from the high end of the conveyor.

6. An apparatus for dewatering sand comprising an endless belt conveyor, means supporting the conveyor with its upper run disposed at an inclination to the horizontal and so as to present a flat and plain inclined surface, means for driving the conveyors at a slow speed, trough-forming walls positioned above the upper run of the conveyor and transversely spaced from each other and inwardly spaced from the side edges of the conveyor to define a trough open at its top and at its ends and having its bottom constituted by the portion of the upper run of the conveyor comprehended between said walls, the lower edges of said walls being spaced from the underlying surfaces of the conveyor to define lengthwise drainage slots, means coacting with the edge portions of the conveyor and with said walls to define drainage channels bottomed by the edge portions of the upper run of the conveyor located between the outside of said walls and the inside of said means, said drainage channels extending lengthwise of the upper run of the conveyor from end to end thereof, and means for feeding sand loaded with an excess of water at a rate to build up a bed of such material on the upper run of the conveyor and in the trough thereof of a depth approximately equal to the height of the trough so that the water suspended in the sand is placed under a hydrostatic head which accelerates the natural tendency of the water to flow clear of the particles of the sand and cause it to drain not only off of the lower end of the conveyor belt but also laterally out through the drainage slots and down through the drainage channels.

7. An apparatus for separating solid mineral aggregates from water suspended therein and comprising an inclined endless conveyor, and trough-forming walls positioned above the upper run of the conveyor and transversely spaced from each other and inwardly spaced from the side edges of the conveyor to define a trough open at its top and at its ends and having its bottom constituted by the portion of the upper run of the conveyor comprehended between said walls, the lower edges of said walls being spaced from the underlying surfaces of the conveyor to define lengthwise drainage slots.

8. An apparatus for separating solid mineral aggregates from water suspended therein and comprising an inclined endless conveyor, trough-forming walls positioned above the upper run of the conveyor and transversely spaced from each other and inwardly spaced from the side edges of the conveyor to define a trough open at its top and at its ends and having its bottom constituted by the portion of the upper run of the conveyor comprehended between said walls, the lower edges of said walls being spaced from the underlying surfaces of the conveyor to define lengthwise drainage slots, and skirt boards coacting with the edge portions of the conveyor and with said walls to define drainage channels bottomed by the edge portions of the upper run of the conveyor located between the outside of said walls and the inside of said skirt boards, said drainage channels extending lengthwise of the upper run of the conveyor from end to end thereof.

9. An apparatus for separating solid mineral aggregates from water suspended therein and comprising an inclined endless conveyor, trough-forming walls positioned above the upper run of the conveyor and transversely spaced from each other and inwardly spaced from the side edges of the conveyor to define a trough open at its top and at its ends and having its bottom constituted by the portion of the upper run of the conveyor comprehended between said walls, the lower edges of said walls being spaced from the underlying surfaces of the conveyor to define lengthwise drainage slots, and a scraper extending across and adjacent to the surface of the conveyor emerging from the trough at the high end of the conveyor for separating the dewatered mineral aggregate from the thin strata next adjacent the surface of the conveyor.

10. An apparatus for separating solid mineral aggregates from water suspended therein and comprising an inclined endless conveyor, trough-forming walls positioned above the upper run of the conveyor and transversely spaced from each other and inwardly spaced from the side edges of the conveyor to define a trough open at its top and at its ends and having its bottom constituted by the portion of the upper run of the conveyor comprehended between said walls, the lower edges of said walls being spaced from the underlying surfaces of the conveyor to define lengthwise drainage slots, a scraper extending across and adjacent to the surface of the conveyor emerging from the trough at the high end of the conveyor for separating the dewatered mineral aggregate from the thin strata next adjacent the surface of the conveyor, and a return pan underlying and extending lengthwise of the conveyor for receiving the thin strata of sand and water carried past the scraper and returning it to the discharge end of the machine.

11. An apparatus for separating solid mineral aggregates from water suspended therein and comprising an inclined endless conveyor, trough-forming walls positioned above the upper run of the conveyor and transversely spaced from each other and inwardly spaced from the side edges of the conveyor to define a trough open at its top and at its ends and having its bottom constituted by the portion of the upper run of the conveyor comprehended between said walls, the lower edges of said walls being spaced from the underlying surfaces of the conveyor to define lengthwise drainage slots, and means for spraying the materials in the trough with water as they are advanced through the trough.

12. An apparatus for separating materials comprising an endless conveyor, means supporting the conveyor with its upper run disposed at an inclination to the horizontal, means for driving the conveyor at a slow speed, trough-forming walls positioned above the upper run of the conveyor and transversely spaced from each other and inwardly spaced from the side edges of the conveyor to define a trough open at its top and at its ends and having its bottom constituted by the portion of the upper run of the conveyor comprehended between said walls, the lower edges of said walls being spaced from the underlying surfaces of the conveyor to define lengthwise drainage slots, and means coacting with the edge portions of the conveyor and with said walls to define drainage channels bottomed by the edge portions of the upper run of the conveyor and extending lengthwise thereof along the outsides of said walls.

13. An apparatus for separating solid mineral aggregates from water suspended therein and comprising an endless conveyor, trough-forming walls positioned above the upper run of the conveyor and transversely spaced from each other and inwardly spaced from the side edges of the conveyor to define a trough opened at its top and its ends and having its bottom constituted by the portion of the upper run of the conveyor comprehended between said walls, means for driving the conveyor at a slow speed, and means for feeding aggregate loaded with water at a rate to build up a bed of such material in said trough to a depth such that the water suspended in the aggregate is placed under a substantial hydrostatic head, there being lateral drainage slots along each side of the bottom of the trough through which the water drains from said bed of material under the influence of its natural tendency and under the influence of said hydrostatic head.

14. An apparatus for separating solid mineral aggregates from water suspended therein and comprising an endless conveyor, trough-forming walls positioned above the upper run of the conveyor and transversely spaced from each other and inwardly spaced from the side edges of the conveyor to define a trough opened at its top and its ends and having its bottom constituted by the portion of the upper run of the conveyor comprehended between said walls, means for driving the conveyor at a slow speed, means for feeding aggregate loaded with water at a rate to build up a bed of such material in said trough to a depth such that the water suspended in the aggregate is placed under a substantial hydrostatic head, there being lateral drainage slots along each side of the bottom of the trough through which the water drains from said bed of material under the influence of its natural tendency and under the influence of said hydrostatic head, and a scraper extending across and adjacent to the surface of the conveyor emerging from the trough for separating the dewatered aggregate from the thin strata next adjacent the surface of the conveyor.

FRED T. KERN.